United States Patent [19]
Tschirner

[11] Patent Number: 5,702,045
[45] Date of Patent: Dec. 30, 1997

[54] ROLL FOR THE PRESSURE TREATMENT OF CLOTH WEBS

[75] Inventor: Wolfgang Tschirner, Tonisvorst, Germany

[73] Assignee: Ramisch Kleinewefers GmbH, Krefeld, Germany

[21] Appl. No.: 505,873

[22] Filed: Jul. 24, 1995

[30] Foreign Application Priority Data

Nov. 8, 1994 [DE] Germany .............. 44 28 420.9

[51] Int. Cl.⁶ .............. B21B 31/00; B65H 75/24; F16C 13/00
[52] U.S. Cl. .............. 226/191; 242/573; 242/573.4
[58] Field of Search .............. 226/190, 191, 226/194, 196; 242/573, 573.1, 573.4

[56] References Cited

U.S. PATENT DOCUMENTS

| | | | |
|---|---|---|---|
| 2,203,862 | 6/1940 | Eason | 192/88 |
| 3,578,228 | 5/1971 | Steiner | 226/191 |
| 3,679,115 | 7/1972 | Stock | 226/194 |
| 3,684,146 | 8/1972 | Fedrigo | 226/194 |

FOREIGN PATENT DOCUMENTS

| | | | |
|---|---|---|---|
| 0223686 | 9/1959 | Australia | 226/191 |
| 0463366B1 | 4/1994 | European Pat. Off. | |
| 862847 | 1/1953 | Germany. | |
| 3105171 | 3/1983 | Germany. | |
| 0515146 | 5/1976 | U.S.S.R. | 226/191 |

*Primary Examiner*—Daniel P. Stodola
*Assistant Examiner*—Matthew A. Kaness
*Attorney, Agent, or Firm*—Dickinson, Wright, Moon, Van Dusen & Freeman

[57] ABSTRACT

A roll for the pressure treatment of cloth webs comprising: a stationary beam, a shell mounted for rotation relatively to the beam, support elements for equalizing roll shell deflection, and a biasing system so acting on the support elements that the same apply a radial force to the shell, is characterised in that a clamping formation consisting of a number of adjacent conical rings which extend in the direction of the roll beam and of a number of clamping rings which are disposed between the conical rings and which are adjacent the shell is provided, is mounted axially and can be acted on by an axial force which is so deflected in the clamping formation that the same applies a radial force to the shell.

26 Claims, 2 Drawing Sheets

ROLL FOR THE PRESSURE TREATMENT OF CLOTH WEBS

The invention relates to a roll for the pressure treatment of cloth webs comprising: a stationary beam, a shell mounted for rotation relatively to the beam, support elements for equalizing roll shell deflection, and a biasing system so acting on the support elements that the same apply a radial force to the shell.

A roll of this kind is known from DE-C31 05 171 For practical use it has proved essential to take steps ensuring rapid and ready changing of the shell when it is required to use this system roll for different applications such as often occur, for example, in textiles. To this end, EP-B0 463 366 proposes that the shell be in two parts, the inner part and the outer part having dimensions such that in the inoperative state and without any action by a pressure medium sufficient clearance exists between the two parts for the outer part to be drawn off or drawn on but also so that a positive pressure can be produced inside the shell or roll by means of a pressure medium so to deform the inner part that the same engages the outer part in a press fit. Without external action this arrangement cannot follow the changing conditions arising from temperature changes.

It is the object of this invention so to devise the roll known from DE-C31 05 171 that not only can the shell be changed relatively quickly but also a tight fit of the shell, which must not be disturbed more particularly by rapid temperature change, is provided.

BACKGROUND OF THE INVENTION i. Field of the Invention

This problem is solved by a roll according to claim 1. The subclaims relate to advantageous developments. A method of drawing on the roll shell is set out in claim 19 and a procedure for temperature equalisation is set out in claim 20.

ii. Description of the Prior Art

According to the invention, a clamping formation is provided, consisting of a number of adjacent conical rings which extend in the direction of the roll beam and of a number of clamping rings which are disposed between the conical rings and which are adjacent the shell, said clamping formation being mounted axially and being adapted to be subjected to axial force which is so deflected in the clamping formation that the same applies a radial force to the shell. To release the shell, in addition to the conventional steps, for example, of releasing the roll from its mounting and tilting the roll so that the shell is freed completely from the roll, the axial force acting on the clamping formation must be decreased so that the clamping rings release the shell, whereafter the same can readily be pulled off. Conversely, in the drawing-on of a new shell the clamping formation is biased axially so that the clamping rings apply a radial force to the shell and engage the same with the arrangement tightly and without clearance.

SUMMARY OF THE INVENTION

Conveniently, the roll is so devised that the or each clamping ring which is disposed in or near the roll centre-plane which extends perpendicularly to the roll axis is displaceable relatively to the shell with less force input than the clamping rings disposed towards the roll end faces. The point is that it is desirable for the centrally disposed clamping rings to be the first to be engaged with one another by the axial force before the clamping rings disposed further out are moved inwards.

In this event it is generally sufficient if the force input required to displace a clamping ring increases stepwise from clamping ring to clamping ring from the centre-plane perpendicular to the roll axis to the roll end faces, so that in all cases a number of clamping rings, but never all of them, are moved simultaneously.

Conveniently, however, the force input necessary to displace a clamping ring can be different from clamping ring to clamping ring.

The force is applied from both sides of the roll towards the centre so that the pattern of the force in the clamping formation develops symmetrically. It should be pointed out that the axial force is always greater than the radial force produced by the hydraulic biasing system so that the shell seats reliably on the clamping formation.

Various steps are conceivable to produce the required force input pattern. The basic concept is that the clamping rings have different sliding properties in relation to the shell and/or to the conical rings engaging therewith, the different sliding properties being produced by the choice of material for the clamping rings, for example, with the aim of the clamping rings at the centre of the roll having a lower modulus of elasticity than towards the roll end faces, by an alteration of the seating surface of the clamping rings on the shell and/or associated conical rings or by any combination of these steps. If it is required to produce the different sliding properties by different qualities of material, then for example, polyurethanes are suitable, their hardness being adjustable substantially steplessly in a range from 40 Shore to 90 Shore. Rubber is less suitable, for although it is available in various hardnesses its sliding properties are much inferior to those of polyurethanes. However, should rubber be used, one possibility would be for the clamping rings to be made of a composite material, for example, the seating surfaces could be made of a material having enhanced sliding properties.

According to another possibility for producing the differences in force input, the angles of inclination of the clamping rings are different, the angle of inclination of the or each clamping ring which is on or near the roll centre-plane extending perpendicularly to the roll axis being less than the angle of inclination of the clamping rings disposed towards the roll end faces.

In another development, each clamping ring consists of a number of clamping segments disposed radially around the roll axis, there being provided for each clamping ring a spring which extends around all the clamping segments, the strength of the spring for the or each clamping ring which is in or near the said centre-plane of the roll perpendicular to the roll axis being less than the strength of the springs in the clamping rings disposed towards the roll end faces.

In another possible development, at least one spring is provided for each clamping ring, the strength of the springs being substantially identical, the number of springs for the clamping rings disposed near the roll centre-plane hereinbefore defined being less than the number for clamping rings disposed towards the roll end faces.

The springs have the dual function of holding the group of clamping segments together and to produce the prestressing necessary for the graded axial input of force.

In all embodiments the angle of inclination of the clamping rings should be between 10° and 30°.

It has been found advantageous to produce the force acting axially on the clamping formation hydraulically, in which event the biasing system available in any case for equalizing roll deflection can be used. All that is necessary is to provide additional means for the axial actuation.

A structural component of this kind can consist, for example, of a piston which is guided in a cylinder and which acts on the clamping formation directly or indirectly, advantageously by way of an axial cylinder roller bearing.

Advantageously, in the clamping formation arrangement according to the invention the conical rings form the outer bearing tube of the shell mounting.

If the clamping rings are thermally insulating members, for example, of ceramic or plastic or compound insulants, the clamping formation can prevent the propagation to the roll interior of a special temperature profile produced on the shell. This may be advantageous not only for energy reasons but also to insulate the more inwardly disposed parts, the oil lubrication of the bearings also being ensured, and last but not least the reduction in mass means that this feature helps to expedite heating and cooling of the shell.

According to another preferred feature of the invention, the shell has in it channels which extend parallel to the axis (parallel to the beam) and which can be supplied in controlled manner with a heating medium or a cooling medium.

To enhance heat insulation between the shell and the beam, telescopic insulating devices are disposed near the shell and cover such zones thereof as are not acted upon by a clamping formation. The telescopic feature is provided because the devices must readjust axially when the length relationships between the clamping formation and the shell alter, for example, because of changes in temperature.

Separate oil circuits are provided for the biasing system, the heating and cooling medium and for lubrication. Consequently, when the shell is released only the pressure medium connections for the heating or cooling medium, which of course flows through the shell, need to be released.

In a method of drawing the shell on to a roll as hereinbefore described, with the clamping formation released the clamping shell is drawn thereover with clearance, and an axial force is applied to the clamping formation from both sides so that the clamping rings of the clamping formation are moved towards one another axially and because of the force deflection produced by the conical rings are raised radially until engaging the inside of the shell. A procedure for equalizing thermally-induced changes in roll diameter also makes use of the fact that axial force is applied to the clamping formation from both sides so that the clamping rings of the formation are moved towards one another axially and by the force deflection produced by the conical rings raised radially until engaging the inside of the shell. On this basis the formation follows the shell when the same expands thermally and yields to the stress when the shell contracts at reduced temperatures.

The invention will be described in greater detail hereinafter merely by way of example with reference to the accompanying drawings wherein:

DESCRIPTION OF THE PREFERRED EMBODIMENT

Figure 1:
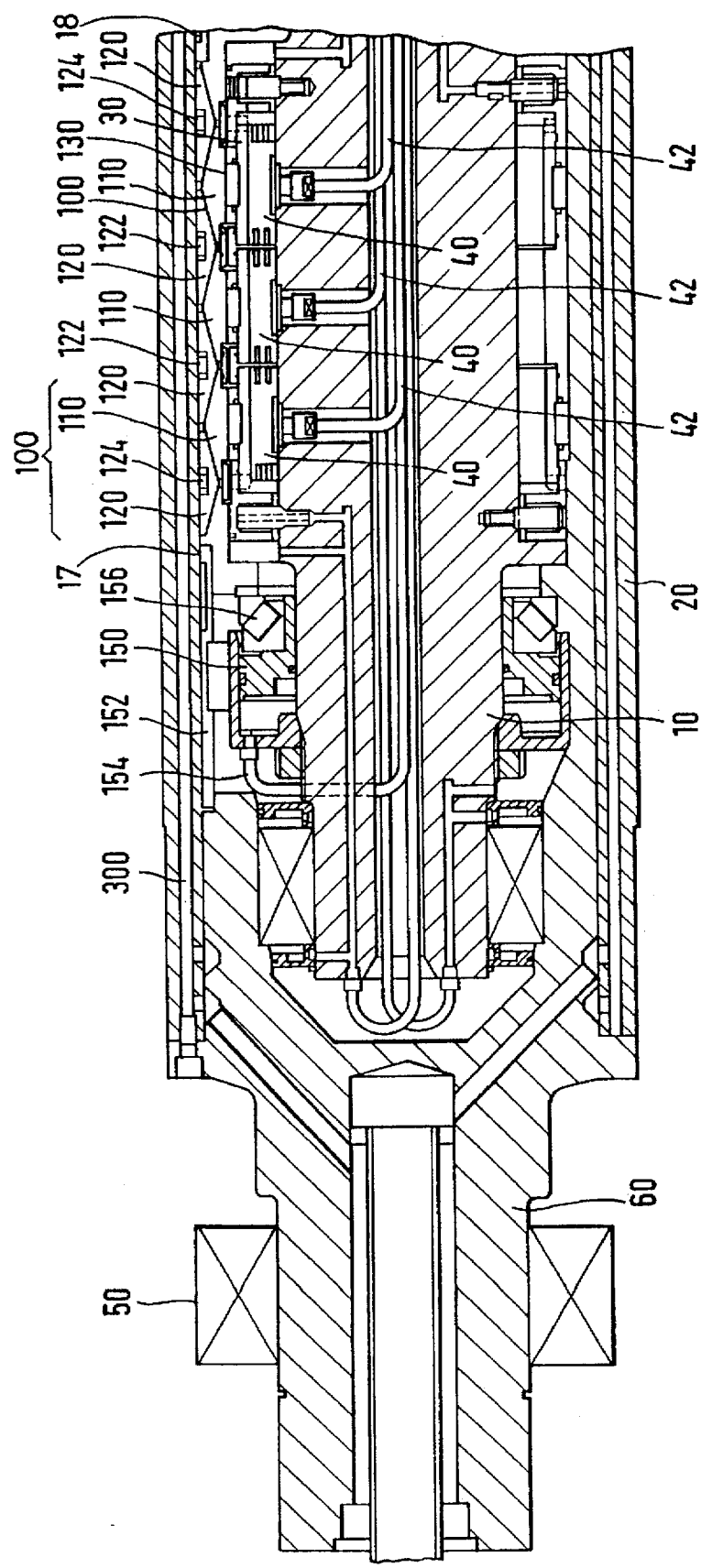
FIG. 1 is a partly fragmented view in longitudinal section on the axial plane of a roll according to this invention.

FIG. 1 is a view in longitudinal section through the roll axis of a roll of an embodiment of this invention, the view being partly broken away. The roll is used as a system roll in calender arrangements. A stationary roll beam, diagrammatically indicated here by the reference numeral 10, has pressure lines for the different oil circuits, viz. the oil circuit for the hydraulic biasing system, special emphasis being placed on the lines 42 which actuate the support elements for deflection equalization of the shell, the support elements being in this case in the form of metal bellows 40. Other pressure lines are provided for axial actuation of a clamping formation whose position is indicated by the reference numeral 100 and they will be described in greater detail hereinafter in connection with the clamping formation. Pressure lines for the lubricating oil circuit are also provided and a third system of lines supplies heating medium or cooling medium to channels 300 which extend in the shell 20 parallel to the beam or roll axis. Since these three circuits are separate from one another, when it is required to change the shell 20 all that is necessary is to disconnect the circuit for the heating or cooling medium.

To compensate for roll deflection the bellows 40 press on inner race 30 of a bearing rolling on a number of rollers 130 of the rolling bearing. The outer race of the bearing is a part of the clamping formation 100, as will be described in greater detail hereinafter. The bellows 40 can be supplied with pressure medium independently of one another through the lines 42 and thus, by transmitting the pressure to the shell 20, form the system for producing the pressure in the nip between the system roll and the companion roll for equalizing roll deflection, the same being due to roll dead-weight, and to compensate for deflection of the system roll. The roll itself is retained in known manner in the system arrangement in outer bearings 50 where the force is applied to press the roll against a companion roll or another system roll by force being applied to the journals 60.

The clamping formation 100 mainly comprises a number of conical rings 110 which together form the bearing outer race previously mentioned. The total number of conical rings depends upon roll length. The conical rings 110 have bearing surfaces for clamping rings 120, the same taking the form of a skewed plane so that when the formation 100 is actuated axially of the roll the clamping rings 120 are deflected radially by the contact surfaces of the conical rings 110 and thus apply the required radial force to the shell 20. Each clamping ring 120 has a spring element 122, 124 whose operation will become more clearly apparent in connection with FIG. 2. One function of the spring element 122, 124 is to produce a certain prestressing between the clamping rings 120 and the conical rings 110 in order that the required axial and resulting radial displacement of the clamping rings may occur in a particular sequence. To this end, the spring elements 122 in the clamping rings 120 which are near the roll centre-plane A, the same extending perpendicularly to the beam 10 or roll axis, are weaker than spring elements 24 disposed in clamping rings 120 in a more outwards position. When an axial force is applied to the two outside ends or sides of the formation 100, the innermost clamping rings having the weaker springs 122 move first, whereafter the outermost clamping rings move one after another in order of increasing spring strength. Consequently, the clamping rings in the central part of the roll engage one another first to produce the radial force profile required to ensure that the shell 20 seats securely. The axial force actuation is itself produced hydraulically, a pressure medium acting through a hydraulic line 154 on an axial clamping piston 150 moving in a cylinder 152. The piston 150 acts on an axial cylinder roller bearing 156 which transmits the axial movement of the piston to the formation 100. An important consideration is that the force is so selected as a result of this axial actuation that the formation 100 is not rendered inoperative when other forces exerted by the elements of the deflection control system—i.e., more particularly the metal bellows 40—are operative. The shell 20 is thermally insulated from the beam 10 by the telescopic insulating means 17, 18 which are disposed near the shell 10 and which cover such zones 20 as are not acted upon by a clamping formation 100.

Since the clamping rings 120 and conical rings 110 are acted on only by pressure forces and not by bending forces, they can be made entirely of a relatively brittle material such as ceramic, a feature which may be important for cost reasons. The ceramic members also act as insulators and thus screen the interior of the roll from any heating or cooling medium flowing through the shell. Should the same expand suddenly because of a temperature change, the formation 100 follows the expansion because of the axial actuation and thus ensures the necessary equalizing so that the shell 20 continues to be retained without clearance. When the temperature of the shell 20 decreases, the same applies a pressure to the formation 100 so that the same retreats radially inwards. Automatic compensation for expansion is therefore provided.

Figure 2:
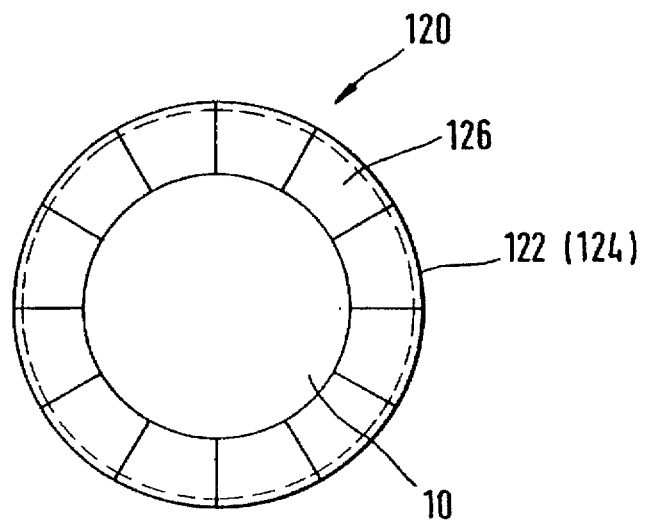
FIG. 2 is a view in section perpendicular to the roll axis of an embodiment of a clamping ring for a roll of the kind shown in FIG. 1.

The construction of a clamping ring will be more clearly apparent from FIG. 2. In the embodiment shown it consists of a number of clamping segments 126 disposed in radially symmetrical manner around the beam 10. Extending around the clamping segments 126 is a spring element 122 (or 124) which serves to hold the group of segments together to form a clamping ring 120 and also ensures correct prestressing between the shell 20 and the clamping ring 120. As already stated in connection with FIG. 1, the strengths of the spring elements are such that the biasing increases stepwise from the roll centre to the roll ends.

Figure 3:
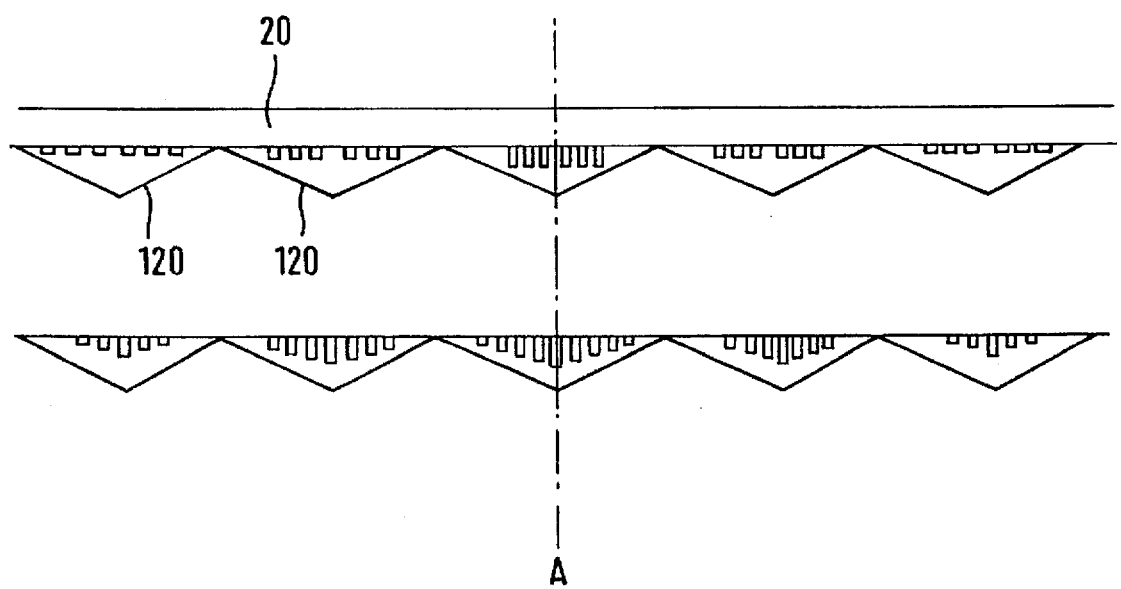
FIG. 3 is a partial view in longitudinal section of an arrangement of another form of clamping ring below the shell of a roll.

In addition to many other possible ways of producing the radial force distribution necessary for correct operation of the clamping formation, FIG. 3 shows by way of example how graduated prestressing can be produced by the effective cross-section of the clamping rings 120 being varied. For example, the clamping rings 120 can be formed with a number of recesses of different depths. The idea behind this is not to alter the seating surface of the clamping ring 120 on the shell 20 but, as it were, to adapt the inherent rigidity of each clamping ring 120 in graded manner, the clamping ring with the weakest prestressing—i.e., in this case the clamping ring with the smallest operative cross-section—again being disposed at the centre of the roll on the plane A.

The features of the invention disclosed in the foregoing description, claims and accompanying drawings can be significant individually and in any combination of the invention in its various embodiments.

The invention claimed is:

1. A roll for the pressure treatment of cloth webs comprising:
   support means for supporting a shell;
   clamping means for rotatably securing said shell on said support means wherein said clamping means has a plurality of adjacent conically shaped rings which are rotatably mounted around said support means and at least one clamping ring interposed between said conically shaped rings and an inner surface of said shell;
   a force applying assembly for providing a compressive force parallel to a longitudinal axis of said support means and against at least said at least one clamping ring to urge said at least one said clamping ring into contact with said inner surface of said shell; and
   biasing means for providing a radial force along portions of said shell.

2. The roll assembly according to claims 1, wherein each clamping ring disposed in or near a center-plane of said shell extending perpendicularly to an axis of said shell is displaceable with less force than said clamping rings positioned at or near an outer edge of said shell.

3. The roll assembly according to claim 2, wherein each said clamping ring inward from said outer edge of said shell is displaceable with progressively less force.

4. The roll assembly according to claim 1, wherein each clamping ring is displaceable with a differing amount of force.

5. The roll assembly according to claim 1, wherein said clamping rings are displaceable with substantially equal amounts of force.

6. The roll assembly according to claim 1, wherein said clamping rings have different sliding characteristics.

7. The roll assembly according to claim 1, wherein said clamping rings have a first and a second inner surface and an outer surface.

8. The roll assembly according to claim 7, wherein said first and second inner surfaces have an angle of inclination with respect to said outer surface.

9. The roll assembly according to claim 8, wherein said angle of inclination of said clamping rings is between 10° and 30°.

10. The roll assembly according to claim 8, wherein said angle of inclination for each said clamping ring on or near a center-plane of said shell extending perpendicularly to the axis of said shell is less than said angle of inclination of said clamping rings positioned at or near an outer edge of said shell.

11. The roll assembly according to claim 1, wherein said at least one clamping ring comprises: a plurality of segments defining a substantially circular ring and spring means positioned about the perimeter of said circular ring for retaining said segments.

12. The roll assembly according to claim 11, wherein said spring means for said clamping rings located in or near a center-plane of said shell extending perpendicularly to the axis of said shell applies less force on said segments than said spring means on said clamping rings positioned at or near an outer edge of said shell.

13. The roll assembly according to claim 11, wherein said spring means for each clamping ring comprises substantially identical springs.

14. The roll assembly according to claim 13, wherein said spring means for said clamping rings located in or near a center-plane of said shell extending perpendicularly to the axis of said shell comprises fewer springs than said spring means on said clamping rings positioned at or near an outer edge of said shell.

15. The roll assembly according to claim 1, wherein said biasing means provides an axial force on at least a portion of said clamping means.

16. The roll assembly according to claim 1, wherein said force applying assembly comprises a piston guided in a cylinder.

17. The roll assembly according to claim 16, wherein said force applying assembly further comprises an axial cylinder roller bearing.

18. The roll assembly according to claim 1, wherein said clamping means form an outer bearing tube for mounting said shell.

19. The roll assembly according to claim 1, wherein said clamping rings are heat-insulating.

20. The roll assembly according to claim 19, wherein said clamping rings comprise a material selected from the group consisting of ceramic, plastic and compound insulants.

21. The roll assembly according to claim 1, wherein said shell has at least one channel extending parallel to its axis for conveying a heating or a cooling medium.

22. The roll assembly according to claim 1, further comprising insulating means for thermally insulating said shell from said support means wherein said insulating means is telescopic.

23. The roll assembly according to claim 1, wherein said assembly further comprises an oil circuit for lubrication and a thermal control system.

24. The roll assembly according to claim 1, wherein said biasing means comprises an oil circuit.

25. A method for changing a shell of a roll comprising the steps of:
　providing a roll comprising:
　　support means for supporting a shell;
　　clamping means for rotatably securing said shell on said support means wherein said clamping means has a plurality of adjacent conically shaped rings which are rotatably mounted around said support means and at least one clamping ring interposed between said conically shaped rings and an inner surface of said shell;
　　a force applying assembly for providing a compressive force parallel to a longitudinal axis of said support means and against at least said at least one clamping means to urge said at least one said clamping ring into contact with said inner surface of said shell; and biasing means for providing a radial force along portions of said shell;

releasing said clamping means;

removing said shell from said support means; drawing a second said shell onto said support means; and energizing said force applying assembly means to compress said clamping means directing at least one of said clamping rings to outwardly expand and engage said inner surface of said shell.

26. The method according to claim 25, further comprising the step of:
　equalizing heat-induced changes in said shell by causing said biasing means to provide an axial movement of at least one conical ring responsive to said heat-induced change.

* * * * *